(12) United States Patent
Mitamura (10) Patent No.: US 7,438,479 B2
(45) Date of Patent: Oct. 21, 2008

(54) OPTICAL RECEPTACLE, OPTICAL SUB ASSEMBLY AND OPTICAL TRANSCEIVER

(75) Inventor: Nobuaki Mitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/779,334

(22) Filed: Jul. 18, 2007

(65) Prior Publication Data

US 2008/0170827 A1    Jul. 17, 2008

(30) Foreign Application Priority Data

Aug. 23, 2006    (JP) ............................. 2006-227198

(51) Int. Cl.
  *G02B 6/36* (2006.01)
(52) U.S. Cl. ......................................... 385/78; 385/88
(58) Field of Classification Search ........................ None
  See application file for complete search history.

(56) References Cited

U.S. PATENT DOCUMENTS

2004/0076384 A1* 4/2004 Kato et al. ..................... 385/92
2004/0264888 A1* 12/2004 Go ................................ 385/92
2005/0013556 A1* 1/2005 Yoshida et al. ................. 385/88
2005/0123240 A1* 6/2005 Seto et al. ....................... 385/35
2005/0238295 A1* 10/2005 Yonemura ...................... 385/92

FOREIGN PATENT DOCUMENTS

| JP | 2004-317848 | 11/2004 |
| JP | 2005-181903 | 7/2005 |

* cited by examiner

*Primary Examiner*—Sung H Pak
(74) *Attorney, Agent, or Firm*—Staas & Halsey LLP (57) ABSTRACT

The present invention relates to an optical receptacle which avoids the occurrence of a large impact at the insertion of the terminal member. The optical receptacle comprises a tubular slit sleeve in which a split is made in an axial direction and into which the plug body is introduced from its first end portion, a tubular solid sleeve into which the plug body introduced is inserted from its one end portion and which has an inner diameter which makes substantially no gap with respect to an outer diameter of the plug body, and an optical propagation member which is secured to the other end portion of the solid sleeve and which is optically coupled to the plug body, with a second end portion opposite to the first end portion of the slit sleeve and the one end portion of the solid sleeve being engaged to be connected to each other.

16 Claims, 10 Drawing Sheets

OPTICAL RECEPTACLE, OPTICAL SUB ASSEMBLY AND OPTICAL TRANSCEIVER

BACKGROUND OF THE INVENTION

1) Field of the Invention

The present invention relates to an optical receptacle, optical sub assembly and optical transceiver suitable for use in TOSA (Transmitter Optical Sub Assembly) or ROSA (Receiver Optical Sub Assembly) to be mounted in a pluggable type optical transceiver module such as SFP (Small Form-Factor Pluggable) or XFP (10 Gigabit Small Form-Factor Pluggable).

2) Description of the Related Art

In recent years, along with the establishment of the MSA (Multi Source Agreement) for a pluggable type optical transceiver module such as SFP or XFP, it has come into widespread use in optical communication systems based upon SONET/SDH (Synchronous Optical NETwork/Synchronous Digital Hierarchy) and Ethernet (registered trademark). In this pluggable type optical transceiver module, optical assemblies with transmission and reception functions, such as TOSA (Transmitter Optical Sub Assembly) and ROSA (Receiver Optical Sub Assembly), are mounted in packages specified in dimension according to the MSA.

Figure 14:
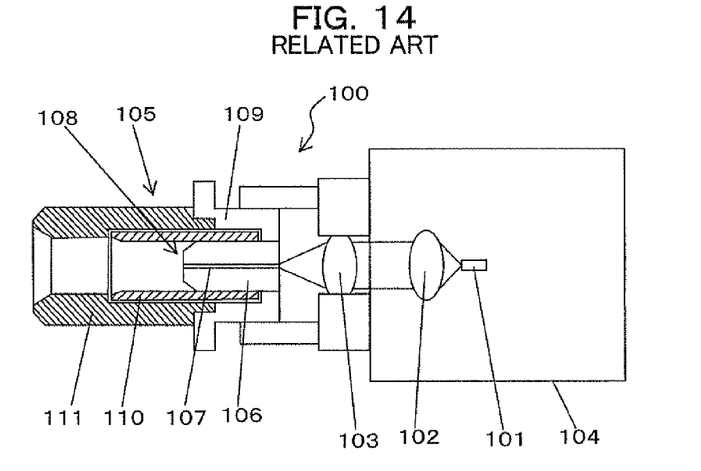
FIG. 14 is a cross-sectional view showing an example of a structure of a TOSA and optical receptacle based upon a conventional technique.

For example, as shown in FIG. 14, a TOSA 100 for the SFP is made up of a semiconductor laser element (hereinafter referred to as an LD element) 101, lenses 102 and 103 for forming a laser beam, emitted from the LD element 101 into a parallel light and a focused light, a package 104 for mounting parts including other electronic parts and a component comprising an optical receptacle 105 for making the connection and introduction of the laser beam to and into a optical connector plug (in the case of the SFP, an LC connector plug, see reference numeral 130 in FIG. 16).

The optical receptacle 105 includes a fiber stub 108, a holder 109 made of a metal or the like, a tubular sleeve 110 and a sleeve case 111 made of a metal or the like. The fiber stub 108 is constructed in a manner such that an optical fiber 107 mainly made of a quartz glass is fixedly inserted into a through hole made in a cylindrical ferrule 106 made of a ceramic material such as zirconia.

In addition, the optical receptacle 105 has a structure in which a rear end side of the fiber stub 108 is inserted into the holder 109, made of a metal or the like, under pressure to be fixed therein and a portion of a cylindrical part forming the sleeve 110 is inserted into a tip side to be embedded therein. Moreover, for preventing the sleeve 110 from protruding, the sleeve case 111 is provided outside the sleeve 110, and this sleeve case 111 is also inserted into the holder 109 to be integrated therewith.

Figure 15:
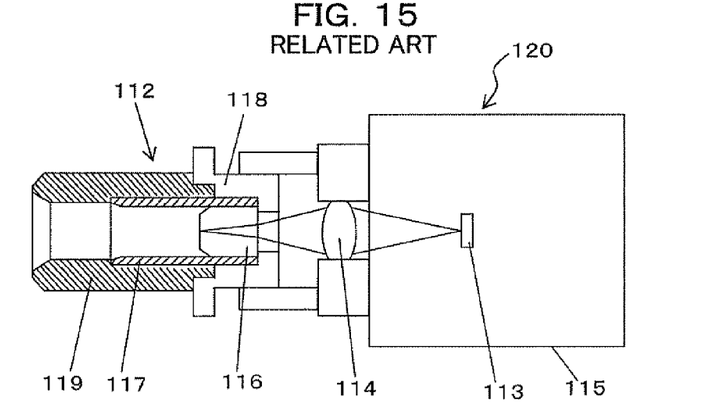
FIG. 15 is a cross-sectional view showing an example of a structure of an ROSA and optical receptacle based upon a conventional technique.

Furthermore, for example, as shown in FIG. 15, an ROSA 120 for the XFP includes an optical receptacle 112 for making a connection of an optical connector plug (in the case of the XFP, an LC connector plug; see reference numeral 130 in FIG. 16), a semiconductor light-receiving element (hereinafter referred to as a PD element) 113, a lens 114 for focusing a laser beam from the optical connector plug on the PD (Photo Diode) element 113 and a package 115 for mounting parts including other electronic parts.

The optical receptacle 112 shown in FIG. 15 has an example of a structure different from that of the optical receptacle 105 shown in FIG. 14, and it includes a tubular sleeve 117, a transparent glass plate 116 fixedly secured through adhesion or the like to an inner surface of the sleeve 117, a sleeve case 119, and a holder 118 for making the precise fixing for integration between the sleeve 117 and the sleeve case 119.

Figure 16:
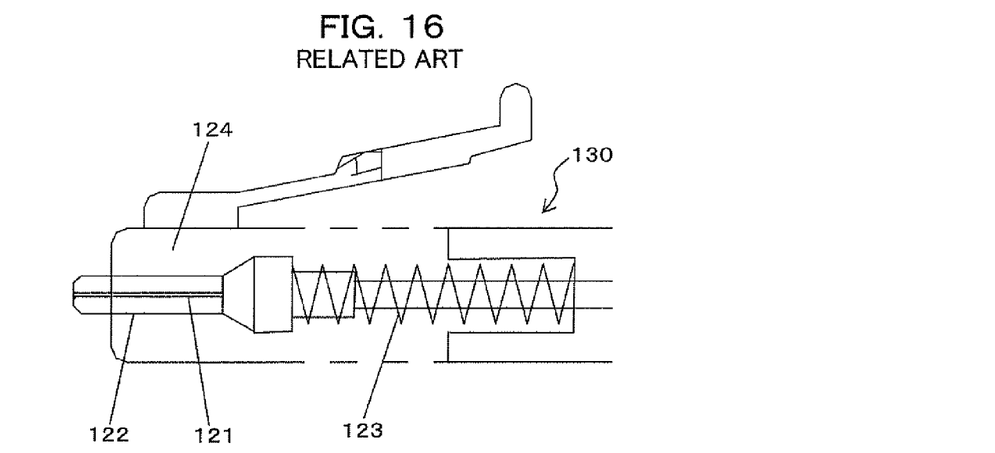
FIG. 16 is a cross-sectional view showing a structure of a common optical connector plug.

On the other hand, as shown in FIG. 16, an optical connector plug (terminal member) 130 is inserted and fitted in the optical receptacle 105 or 112 of the TOSA 100 or the ROSA 120, and it includes a plug ferrule (plug body) 122 where an optical fiber 121 is inserted into a through hole made in its own central portion, a spring 123, which is an elastic body, for making a close adhesion between the plug ferrule 122 and the fiber stub 108 or the glass plate 116 in a manner such that the plug ferrule 122 is physically pressed against the fiber stub 108 or the glass plate 116 by a predetermined force, and a plug housing 124 for accommodating these parts internally.

In recent years, along with the widespread use of the pluggable type optical transceiver module such as SFP or XFP in the field of data communications such as Ethernet, there is a requirement for no occurrence of problems on performance even when it is handled as well as conventional electric connectors. In particular, an increase in the number of optical lines or the number of optical fiber cords encounters an increase in the weight of a plurality of optical fiber cords bundled, so there is a need for almost no variation of the characteristic even if a load is imposed on the optical fiber cord which is in a connected condition. Concretely, for example, there is a need to satisfy a specification in which, for example, the optical output fluctuation in the TOSA (or the reception sensitivity in the ROSA) is within a predetermined variation range (below 1 dB) when a predetermined load (for example, 100 gf) is applied to an optical fiber cord.

For reducing this characteristic variation at the application of a load to the cord, in addition to the structure of a housing of the pluggable type optical transceiver module, it is considered that the structure of an optical receptacle of an optical sub assembly such as the TOSA, particularly a sleeve (see reference numerals 110 and 117 in FIGS. 14 and 15) in the optical receptacle, fulfills an extremely important role. The sleeves commonly put into practical use are roughly classified into a slit sleeve 141 shown in FIG. 17 and a precision sleeve (solid sleeve) 142 shown in FIG. 18.

Figure 17:
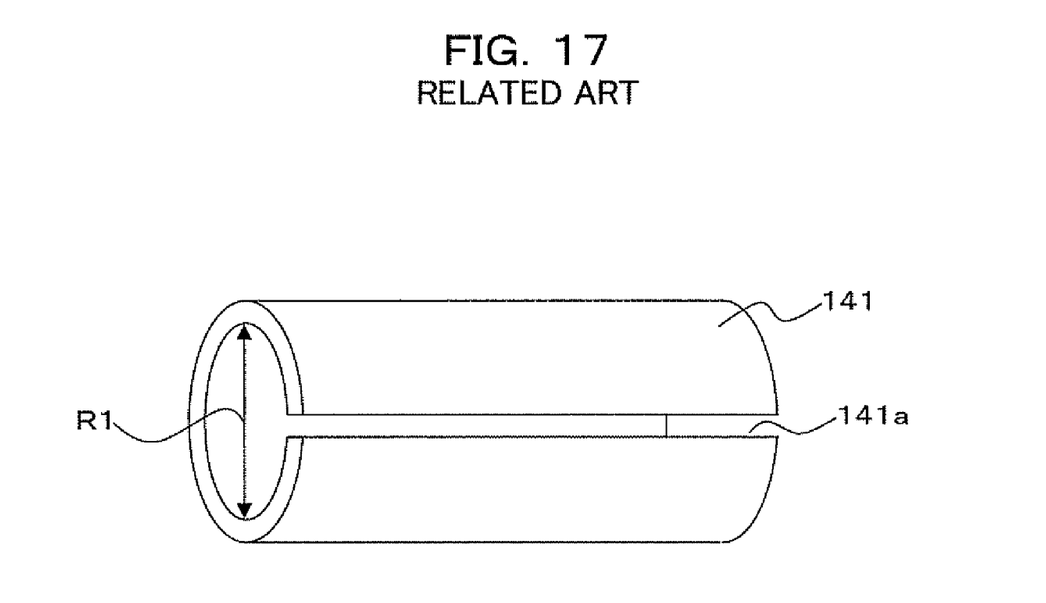
FIG. 17 is a cross-sectional view showing a structure of a slit sleeve based upon a conventional technique.

The slit sleeve 141 shown in FIG. 17 is, in the literature, of a type that a split (slit) 141a is made in a tubular sleeve 141, and the inner diameter R1 of the slit sleeve 141 is set to be slightly smaller than the outer diameters of a fiber stub (see reference numeral 108 in FIG. 14) and a plug ferrule (see reference numeral 122 in FIG. 16). Therefore, the fiber stub and the plug ferrule 122 (see FIG. 16) can be inserted into the slit sleeve 141 by a predetermined force and, after the insertion thereinto, the plug ferrule can be held by its elastic force (closing force against an opening force on the split 141a).

Taking note of the optical receptacle 105 shown in FIG. 14, since the fiber stub 108 is inserted into the holder 109 under pressure and fixed therein, when the slit sleeve 141 shown in FIG. 17 is fitted in both the fiber stub 108 and the inserted plug ferrule 122, the plug ferrule 122 is aligned (lined up) along an outer circumference of the fiber stub 108 by the elastic force of the slit sleeve 141, which enables the axial alignment between optical fibers 107 and 121 which lie at the central portions of both the fiber stub 108 and the plug ferrule 122.

It is not necessarily preferable that he slit sleeve 141 has a higher elastic force. That is, an excessive elastic force enhances a force (usually, a force needed for drawing out the plug ferrule 122, and referred to withdrawal power) needed for the insertion and extraction of the plug ferrule 122. The enhancement of the withdrawal power makes it difficult for the plug ferrule 122 to abut on the fiber stub 108 by the force of the spring 123 as mentioned above, so the plug ferrule 122 and the fiber stub 108 does not reach the close adhesion, which can cause the occurrence of reflection and coupling loss. For this reason, according to the rules such as IEC (International Electrotechnical Commission) and FOCIS (Fibber Optic Connector Intermateability Standards), for example, in the case of an LC connector, the withdrawal power is set to be 1 to 2.5N in order to avoid the excessive power.

Figure 18:
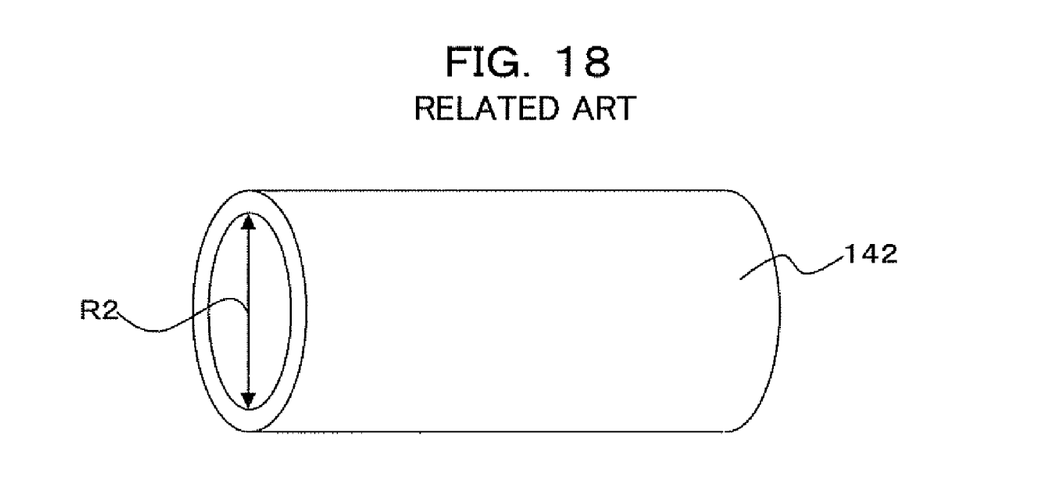
FIG. 18 is a cross-sectional view showing a structure of a precision sleeve based upon a conventional technique.

On the other hand, the precision sleeve 142 has no slit as shown in FIG. 18, and the inner diameter R2 thereof is precisely processed to be slightly larger than the outer diameters of the fiber stub 108 and the plug ferrule 122. Accordingly, the axial alignment between optical fibers in the fiber stub 108 and the plug ferrule 122 can be made precisely with an accuracy of approximately 1 µm.

A description will be given hereinbelow of a behavior in a case in which, assuming that an optical connector plug 130 is connected to the TOSA 100 shown in FIG. 14, a load is applied to an optical fiber cord coupled to the optical connector plug 130. The optical connector plug 130 somewhat moves backwards when the plug ferrule 122 abuts on the fiber stub 108 at the insertion (fitting) into the TOSA 100 and, in this state, in most cases, the optical connector plug 130 does not come into contact with any portion within the plug housing 124, that is, it is in a so-called floating state.

Figure 19:
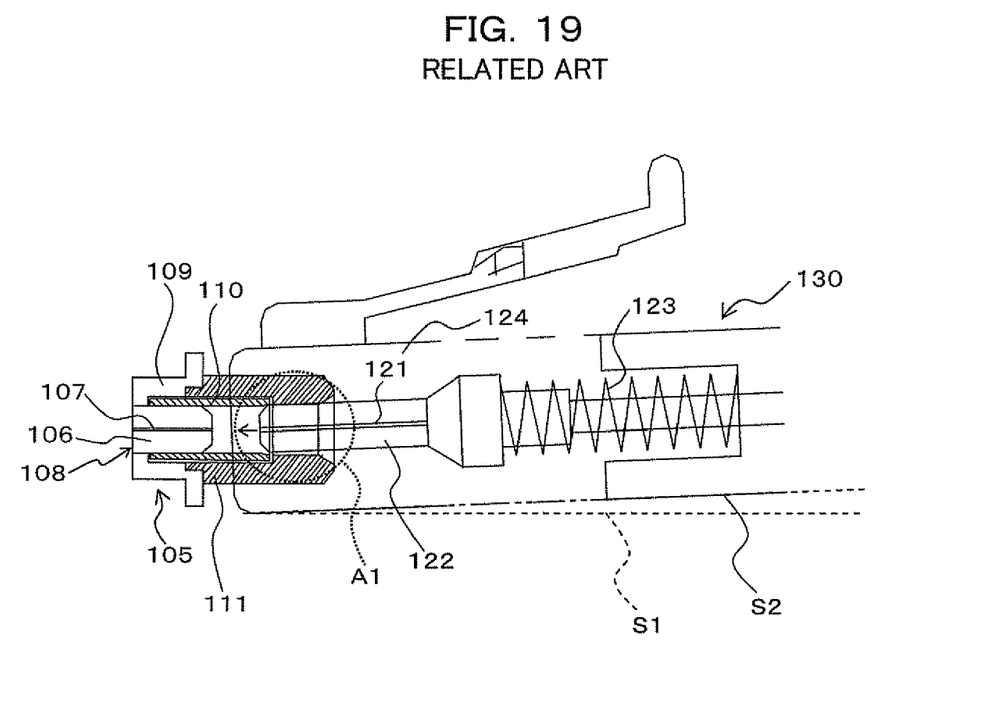
FIGS. 19 to 21 are cross-sectional views showing an operation at the engagement between an optical connector plug and an optical receptacle according to a conventional technique.

However, a large load is applied to a fiber cord, the floating state breaks so that a portion of the load can be applied directly to the plug ferrule 122 as shown in FIG. 19. In such a state, when the slit sleeve 141 shown in FIG. 17 is used as the sleeve 110 for the optical receptacle 105, since the elastic force of the slit sleeve 141 becomes smaller than the load of the plug ferrule 122, the split 141a of the sleeve 141 can be opened so that the axis of the optical fiber 121 within the plug ferrule 122 shifts from the axis of the optical fiber 107 included in the fiber stub 108.

In such a situation, a coupling loss occurs, and in the case of the TOSA, the optical output fluctuates. Thus, in the case of the slit sleeve 141, due to its structure, the slit sleeve 141 can fall into an excessively opened state (its diameter increases) when a load exceeding a predetermined value is applied to the plug ferrule 122, thereby enhancing the characteristic variation at the application of a load to the cord.

On the other hand, the precision sleeve 142 has no slit as mentioned above and, even if a load exceeding a predetermined value is put on the plug ferrule 122, the sleeve 142 does not fall into an opened state (no enlargement of the diameter) except that the precision sleeve 142 breaks down, so the characteristic variation at the application of a load to a cord in the case of the precision sleeve 142 becomes better in comparison with the slit sleeve 141. In particular, in a case in which there is a need to reduce the characteristic variation at the application of a load to the cord, the precision sleeve 142 is sometimes put to use.

As other conventional techniques related to the invention of the subject application, there are techniques disclosed in the following Patent Documents 1 and 2.

The Patent Document 1 discloses a technique on a sleeve structure having an elastic section where a slit is made in a longitudinal direction and a rigid section with no slit which is caulked with a gripping ring.

In addition, the Patent Document 2 discloses a structure of a precision sleeve in which a slit (split) having a width at its central portion wider than a width at its open-end portion is formed from the open-end portion to the central portion in a longitudinal direction.

Patent Document 1: Japanese Patent Laid-Open No. 2004-317848

Patent Document 2: Japanese Patent Laid-Open No. 2005-181903

However, the inventor of the subject application found that the precision sleeve 142 has the following problems.

In the case of the precision sleeve 142, since its inner diameter is larger by only several µm than the outer diameters of a fiber stub and a plug ferrule as mentioned above, the coupling therebetween is not easy. For this reason, in a case in which, for example, the precision sleeve 142 is applied to the sleeve 110 of the optical receptacle 105 as shown in FIG. 19, if the optical connector plug 130 is obliquely inserted into the optical receptacle 105, the tip portion of the plug ferrule 122 gnaws on an entrance portion of the precision sleeve 142 to be caught thereon (see A1 in FIG. 19).

Figure 20:
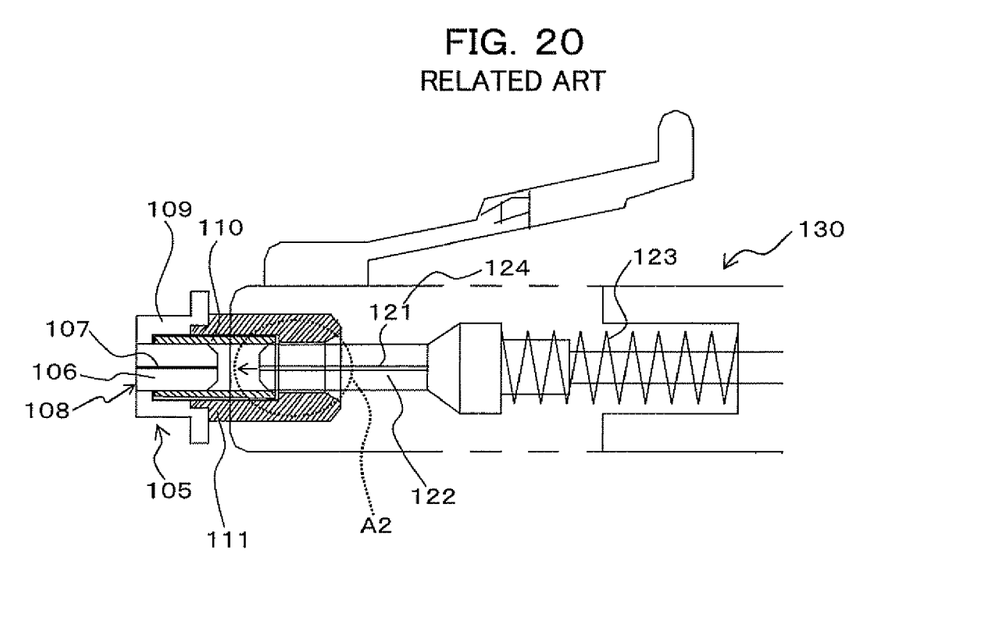

If the insertion of the optical connector plug 130 is further made in a state where the tip portion of the plug ferrule 122 is caught on the entrance portion of the sleeve 110 serving as the precision sleeve, the spring 123 within the optical connector plug 130 is contracted so as to push the plug ferrule 122 into the interior. Thus, when the insertion angel of the optical connector plug 130 is changed as shown in FIG. 20 in the state of the contraction of the spring 123 in the optical connector plug 130, the catching of the plug ferrule 122 is removed (see A2 in FIG. 20), and the plug ferrule 122 is inserted into the sleeve 110 serving as the precision sleeve.

Figure 21:
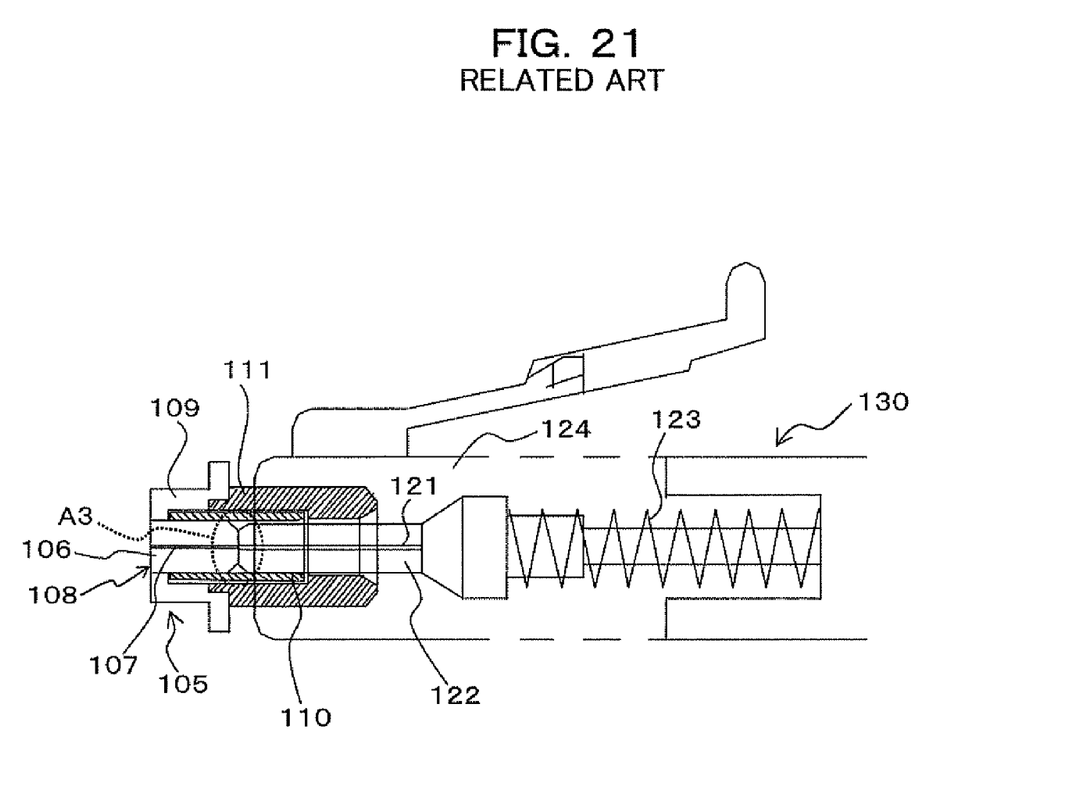

In this case, since the plug ferrule 122 is powerfully inserted thereinto by the force of the contracted spring 123, as shown in FIG. 21, the plug ferrule 122 can violently come into collision with a surface of the fiber stub 108 (see A3 in FIG. 21). At this time, there is a problem in that a large impact exceeding, for example, 10,000 G occurs since the ferrules 106 and 122 made of a hard material such as zirconia come into collision with each other.

Such a large impact leads to that the fiber stub 108 inserted under pressure settles down or the performance of precise electronic parts mounted in the interior of the package 104 suffers degradation. Even in the case of the optical receptacle 112 mentioned above with reference to FIG. 15, almost same problem arises, and the plug ferrule 122 violently comes into collision with a surface of the glass plate 116 so as to produce a large impact exceeding 10,000 G. Such a large impact affects the performance of precise electronic parts mounted in the interior of the package 115. Incidentally, in the case of the optical receptacle 112 shown in FIG. 15, the glass plate 116 and the sleeve 117 are fixed to each other through an adhesive, and the glass plate 116 does not settle down.

In this case, hypothetically, if it is possible to remove the spring 123 on the optical connector plug 130 side, the above-mentioned problems are solvable. However, as mentioned above, the spring 123 is essential for physically bringing the plug ferrule 122 into contact with the fiber stub 108 or the glass plate 116 by a predetermined force to establish the close adhesion therebetween. No employment of the spring 123 makes it difficult to bring the plug ferrule 122 into contact with the fiber stub 108 or the glass plate 116, which leads to the occurrences of reflection and coupling loss. Therefore, the spring 123 itself is an essential member and is necessary.

Figure 22:
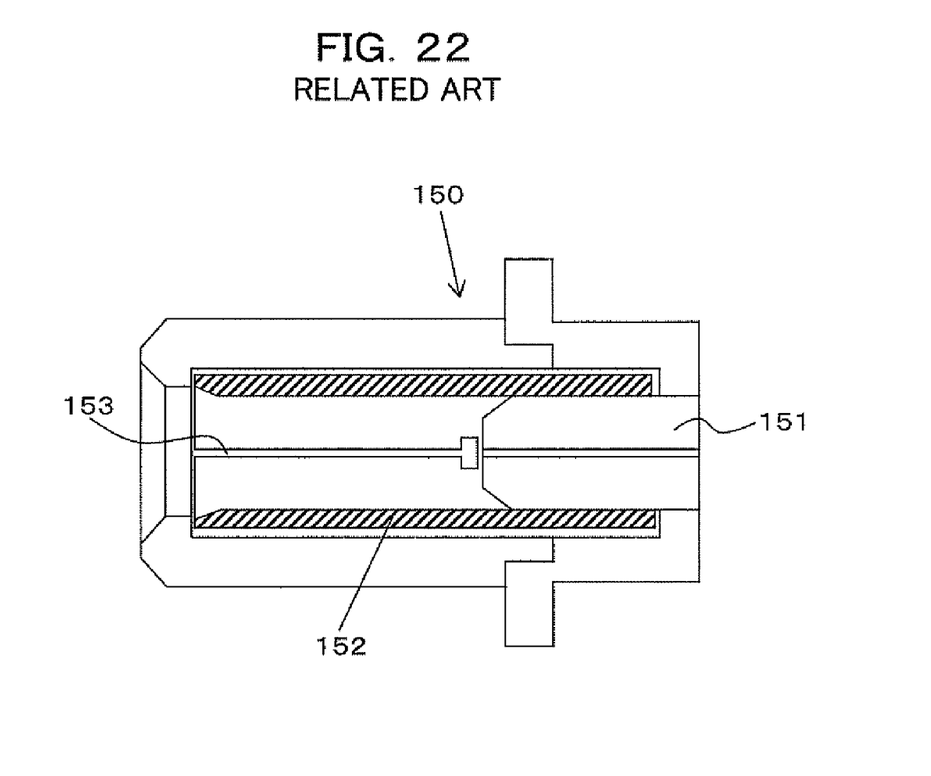
FIG. 22 is a cross-sectional view showing an optical receptacle based upon a conventional technique.

As shown in FIG. 22, the aforesaid Patent Documents 1 and 2 disclose a structure in which, in the optical receptacle 150 formed by fitting the fiber stub 151 in the precision sleeve 152, a slit 153 which is a partial split is made to range from the optical connector plug insertion side of the precision sleeve 152 up to the fiber stub 151 fitted tip position.

However, in this structure, in a state of the insertion of the optical connector plug, the fiber stub is supported in the slit 153 made area of the precision sleeve 152. Accordingly, when a load exceeding a predetermined value is applied to a plug ferrule constituting the optical connector plug, as well as the above-mentioned case of the slit sleeve 141, the slit falls into an opened state, and the disposition of the plug ferrule in the insertion state of the plug ferrule becomes unstable, so the shifting of the optical axis thereof relative to the fiber stub 151 easily occurs.

That is, there is also a problem which arises with the techniques disclosed in the aforesaid Patent Documents 1 and 2 in that the characteristic variation increases at the application of a load to a cord. In fact, in a case in which a TOSA employing the optical receptacle 150 with the above-mentioned structure shown in FIG. 22 was mounted in an SFP and an LC optical fiber cord was connected thereto, when a predetermined load (for example, 100 gf) was applied to the cord and the optical output fluctuation of the TOSA was confirmed, a large fluctuation occurred, so it was of no practical use.

Figure 23:
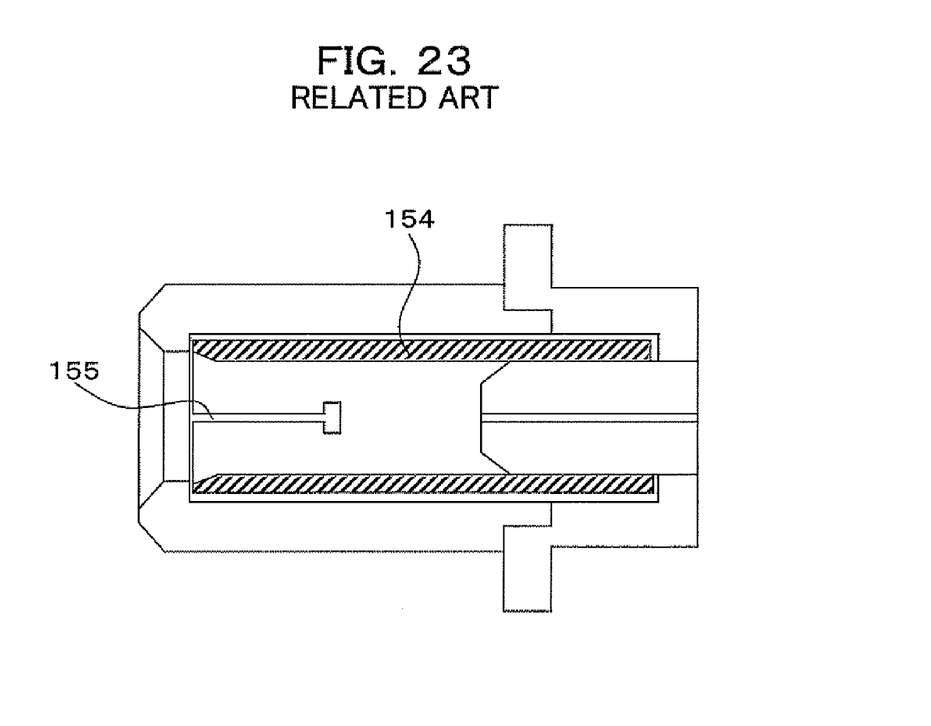
FIG. 23 is a cross-sectional view showing an optical receptacle.

Moreover, for stabilizing the support of the plug ferrule in the inserted state, it is considerable that, as well as a precision sleeve 154 shown in FIG. 23, a slit 155 which is a split is formed up to an intermediate position in a longitudinal direction. However, since this structure has a limit in the enlargement of the opening portion, difficulty is encountered in sufficiently eliminating the above-mentioned catching at the insertion of the optical connector plug. Still moreover, in a case in which the slit is formed up to an intermediate position in the longitudinal direction, the repeated insertion/extraction of the plug ferrule constituting the optical connector plug causes the stress to concentrate on the cut portion forming this slit, so it is considered that cracks starting at this cut portion can occur, which creates a problem in that the lifetime of the optical receptacle becomes shorter.

SUMMARY OF THE INVENTION

The present invention has been developed in consideration of the above-mentioned problems, and it is therefore an object of the invention to provide an optical receptacle with a simple structure, which avoids the occurrence of a large impact by preventing a plug body from coming into collision with an optical propagation member such as a fiber stub or a glass plate due to a force of an elastic body of a terminal member at the insertion of the terminal member while reducing a characteristic variation at the application of a load to a cord.

For this purpose, an optical receptacle according to the present invention, which accepts a plug body constituting an optical terminal member for optical coupling, comprises a tubular slit sleeve in which a split is made in an axial direction and into which the plug body is introduced from its first end portion, a tubular solid sleeve into which the plug body introduced into the slit sleeve is inserted from its one end portion and which has an inner diameter so as not to substantially define a gap with respect to an outer diameter of the plug body and an optical propagation member which is fixedly secured to the other end portion of the solid sleeve and which is optically coupled to the plug body, with a second end portion opposite to the first end portion of the slit sleeve and the one end portion of the solid sleeve being engaged to be connected to each other.

In this case, it is also appropriate that the second end portion of the slit sleeve is connected to the one end portion of the solid sleeve in a state circumscribed thereon, or that the inner diameter of the slit sleeve connected to the solid sleeve is made to be substantially equal to the inner diameter of the solid sleeve or made to be smaller than the inner diameter of the solid sleeve but equal to or larger than the outer diameter of the plug body.

In addition, preferably, the slit sleeve is made with a member whose inner diameter is smaller than the outer diameter of the one end portion of the solid sleeve in a state before the connection to the solid sleeve, and the slit sleeve and the solid sleeve are engaged with each other to make the connection therebetween by means of an elastic force acting to close the split made in the slit sleeve.

Still additionally, preferably, the slit sleeve is formed such that its thickness is larger than the thickness of the solid sleeve.

Moreover, it is also acceptable that the second end portion of the slit sleeve is connected to the one end portion of the solid sleeve in a state inscribed therein, or that the inner diameter of the slit sleeve connected to the solid sleeve is set to be substantially equal to the inner diameter of the solid sleeve. In this case, the slit sleeve is made with a member whose outer diameter is larger than the inner diameter of the one end portion of the solid sleeve in the state before the connection to the solid sleeve, and the slit sleeve and the solid sleeve are fitted with each other to make the connection therebetween by means of an elastic force acting to open the split made in the slit sleeve.

Still moreover, preferably, the slit sleeve has a thickness thinner than the thickness of the solid sleeve.

Yet moreover, it is also appropriate that the second end portion of the slit sleeve and the one end portion of the solid sleeve have a shape to prevent the release (separation) from the engagement therebetween, or that the length of the slit sleeve is set to be shorter than the length of the solid sleeve.

In addition, it is also acceptable that the solid sleeve has an area for supporting the plug body between a tip position of a place where the optical propagation member fixedly secured to the other end portion confronts the plug body and the one end portion connected to the slit sleeve.

Still additionally, it is also acceptable that the optical propagation member is made from a ferrule through which an optical fiber passes, or that the optical propagation member is made from a glass member.

Furthermore, an optical sub assembly according to the present invention includes the optical receptacle thus constructed.

Still furthermore, an optical transceiver according to the present invention includes the optical receptacle thus constructed.

Thus, as an advantage, the present invention can provide an optical receptacle with a simple structure, which avoids the occurrence of a large impact due to the collision of a plug body with an optical propagation member by a force of an elastic body of an optical connector plug at the insertion of the optical connector plug while reducing a characteristic variation at the application of a load to a cord.

DESCRIPTION OF THE PREFERRED EMBODIMENTS

Embodiments of the present invention will be described hereinbelow with reference to the drawings.

The present invention is not limited to the embodiments described below. In addition to the above-mentioned object of the present invention, other technical problems, means for solving these technical problems and advantages will become apparent through the disclosure of the following embodiments.

[a] Description of First Embodiment of the Present Invention

Figure 1:
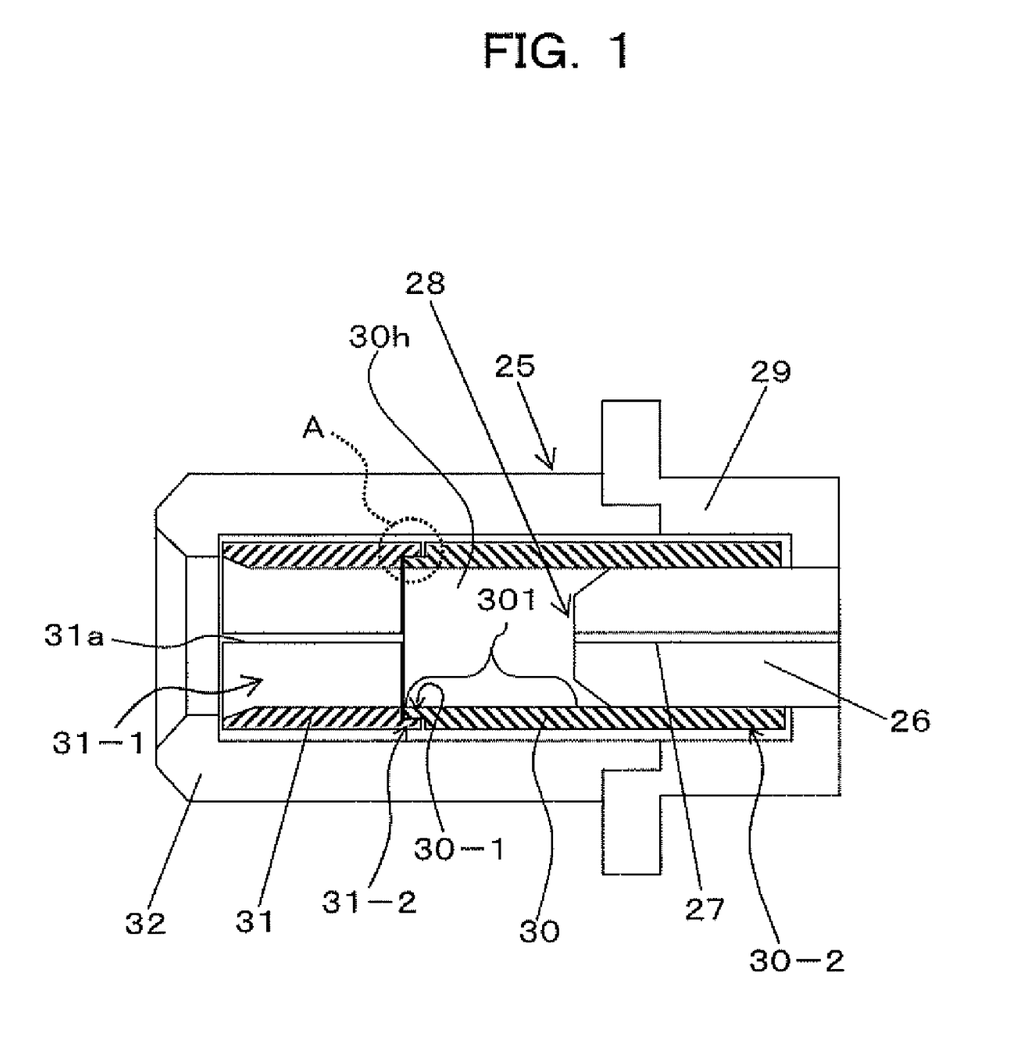
FIG. 1 is a cross-sectional view showing an optical receptacle according to a first embodiment of the present invention.

FIG. 1 is a cross-sectional view showing an optical receptacle 25 according to a first embodiment of the present invention.

The optical receptacle 25 according to the first embodiment is applicable as an optical receptacle for an LC connector for use in a TOSA and ROSA to be mounted in a pluggable type optical transceiver module such as an SFP or XFP. That is, the optical receptacle 25 can accept an terminal member such as the above-mentioned optical connector plug 130 shown in FIG. 16 for optical coupling.

The optical receptacle 25 according to the first embodiment includes a fiber stub 28, a holder 29 made of a metal, a precision sleeve (solid sleeve) 30, a slit sleeve 31 and a sleeve case 32.

The fiber stub 28 is an optical propagation member fixedly fitted in an opposite side (other end portion 30-2 side) to the insertion side (one end portion 30-1 side) of a plug body such as a plug ferrule 122 which is a member constituting the aforesaid optical connector plug 130 in the precision sleeve 30, and it is composed of a cylindrical ferrule 26 made of zirconia and an optical fiber 27 principally made of quartz glass and inserted into a through hole made at the center of the ferrule 26 and fixed therein.

This fiber stub 28 is fixed in the holder 29 in a manner such that its end portion on the side of a connection to a package (see reference numerals 104 and 115 in FIGS. 14 and 15) for optical transmission/reception (not shown) is inserted into the holder 29 under pressure, and further inserted and fitted in the tubular precision sleeve 30. Thus, when the optical receptacle 25 and the optical connector plug 130 shown in FIG. 16 are coupled to each other, the optical fiber 121 of the plug ferrule 122 and the optical fiber 27 are optically coupled to each other.

In addition, the precision sleeve 30 has a tubular configuration having a cavity hole $30h$, and it, together with the fiber stub 28 fitted in its own cavity hole $4h$, is inserted into the holder 29 under pressure to be fixed therein. The precision sleeve 30 can be made of zirconia, and the inner diameter of the cavity hole $30h$ can be set to be slightly larger than an outer diameter (1.2485 to 1.2495 mm) of the plug ferrule 122, for example, it can be set at approximately 1.251 mm.

The slit sleeve 31 having a length shorter than the length of the precision sleeve 30 is disposed on the insertion side (one end portion 30-1 side) of the plug ferrule 122 in the precision sleeve 30. The slit sleeve 31 has a tubular configuration where a split is formed in an axial direction, and the plug body such as the plug ferrule 122 shown in FIG. 16 is introduced thereinto from a first end portion 31-1.

That is, the plug ferrule 122 introduced into the slit sleeve 31 is inserted through this slit sleeve 31 into the precision sleeve 30 from the opposite side to the fitting side of the fiber stub 28. Thus, the optical connector plug 130 and the optical receptacle 25 are coupled to each other, thereby realizing the optical coupling between the plug ferrule 122 and the fiber stub 28.

Figure 2:
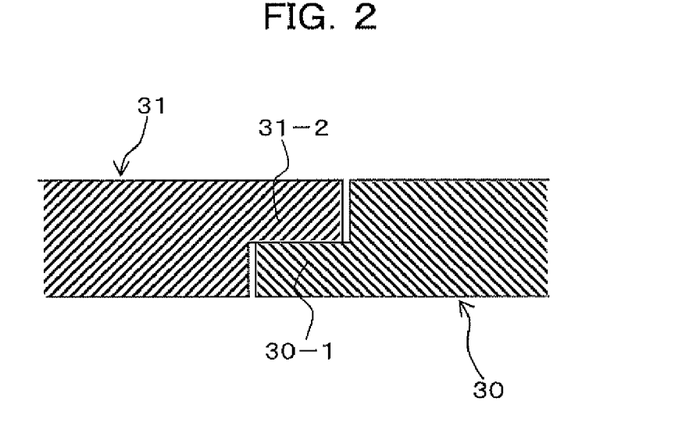
FIG. 2 is an enlarged view showing a connection portion between a slit sleeve and a precision sleeve according to the first embodiment.

In this case, the slit sleeve 31 and the precision sleeve 30 are connected to each other by being engaged with each other. That is, a second end portion 31-2 opposite to a first end portion 31-1 in the slit sleeve 31 and one end portion 30-1 of the precision sleeve 30 are engaged with (fitted into) each other for making a connection therebetween. FIG. 2 is an enlarged view showing the connection portion A in FIG. 1.

As shown in FIG. 2, the one end portion 30-1 of the precision sleeve 30 and the second end portion 31-2 of the slit sleeve 31 are formed as engagement portions having a spot facing structure for making the engagement therebetween. That is, the one end portion 30-1 of the precision sleeve 30 has a cut-out structure that its outer edge portion is cut out, and the second end portion 31-2 of the slit sleeve 31 has a cut-out structure that its inner edge portion is cut out. The precision sleeve 30 and the slit sleeve 31 are engaged with each other by means of these end portions 30-1 and 31-2 for the connection therebetween.

In the first embodiment, as shown in FIG. 2, the second end portion 31-2 serving as the engagement portion of the slit sleeve 31 is circumscribed with respect to the one end portion 30-1 serving as the precision sleeve 30. That is, the slit sleeve 31 and the precision sleeve 30 establish a connection with each other in a state where the second end portion 31-2 comes into contact with an outer edge of the one end portion 30-1.

Moreover, the inner diameter of the slit sleeve 31 in the connected state is set to be approximately equal to the inner diameter of the precision sleeve 30, and the thicknesses of the slit sleeve 31 and the precision sleeve 30 are made to be almost equal to each other. Thus, the plug ferrule 122 introduced through the first end portion 31-1 of the slit sleeve 31 can be inserted without suffering interference when passing through the end portions 31-2 and 30-1 making the above-mentioned connection portion between the slit sleeve 31 and the precision sleeve 30.

Still moreover, in the first embodiment, as the member condition of the slit sleeve 31 before the connection, the inner diameter of the engagement portion 31-2 is made to be smaller than the outer diameter of the engagement portion 30-1 of the precision sleeve 30. Thus, the precision sleeve 30 and the slit sleeve 31 are engaged with each other for the connection therebetween by means of an elastic force produced when the slit sleeve 31 tends to contract, in other words, an elastic force generated when a split 31a (more opened than normal) of the slit sleeve 31 tends to close with the second end portion 31-2 of the slit sleeve 31 being engaged with the one end portion 30-1 of the precision sleeve 30.

In addition, the sleeve case 32 made of a metal or the like is for preventing the precision sleeve 30 or the slit sleeve 31 from springing out, for example, at the withdrawing operation from the optical connector plug 130 which is the connection partner with the optical receptacle 25, and it is inserted into the holder 29 under pressure outside the precision sleeve 30 and the slit sleeve 31 to be integrated with the holder 29. In other words, the sleeve case 29 is placed on the outer edges of the precision sleeve 30 and the slit sleeve 31 for the purpose of protecting and fixing the installation states of these sleeves 30 and 31.

The optical receptacle 25 thus constructed is mounted in a package 104 accommodating an LD element 101 and lenses 102 and 103 similar to those mentioned above with reference to FIG. 14, thereby constituting, for example, a TOSA for SFP. Moreover, when an optical connector plug 130 shown in FIG. 16 is inserted thereinto, light from the LD element 101 can be transmitted through the optical receptacle 25, the optical connector plug 130 and an optical fiber (not shown) connected to the latter stage of the optical connector plug 130.

In the optical receptacle 105 based upon a conventional technique and shown in FIG. 14, let it be assumed that the aforesaid optical connector plug 130 is inserted from the insertion opening side (i.e., the opposite side to the fixed side of the fiber stub 108). At this time, as shown in FIG. 19, in a case in which the optical connector plug 130 is inserted into the optical receptacle 108 in an oblique direction (see solid line S2) shifted from a straight line (see dotted line S1), the tip portion of the plug ferrule 122 can gnaw on an entrance portion of the precision sleeve 110 to be caught thereon. More exactly, as indicated by A1 in FIG. 19, the chamfer end portion on the tip outer circumference of the plug ferrule 122 gnaws on the chamfer end portion on the insertion side inner circumference of the precision sleeve 110 and it is caught thereon.

This is because the inner diameter of the precision sleeve 110 is formed to be larger by only approximately 2 μm than the outer diameters of the fiber stub 108 and the plug ferrule 122, which makes a severe condition on the engagement between the precision sleeve 110 and the plug ferrule 122.

Also in the optical receptacle 25 according to the first embodiment, the optical connector plug 130 is basically inserted from the insertion opening side (i.e., the first end portion 31-1 side of the slit sleeve 31) by the worker's manipulation. However, with the optical receptacle 25 according to the first embodiment, as well as the above-mentioned case shown in FIG. 19, if the optical connector plug is inserted into the optical receptacle in an oblique direction, the tip portion of the plug ferrule 122 is first inserted into the slit sleeve 31.

Since a split (slit) 31a is made along an axial direction of the slit sleeve 31, the split 31a is opened at the insertion of the plug ferrule 122, so the inner diameter thereof easily enlarges, which prevents the tip portion of the plug ferrule 122 from being caught on the entrance portion of the sleeve 110 unlike the case shown in FIG. 19. In particular, according to the first embodiment, since the engagement portion 31-2 of the slit sleeve 31 is circumscribed about the engagement portion 30-1 of the precision sleeve 30 as shown in FIG. 2, the inner diameter of the slit sleeve 31 can relatively freely enlarge, and the catching does not occur. The sleeve case 32 covering the outer edge of the slit sleeve 31 is naturally made so as to allow the enlargement of the inner diameter of the slit sleeve 31 at the insertion of the plug ferrule 122.

In addition, at the insertion of the optical connector plug 130, owing to the elastic force of the slit sleeve 31, the plug ferrule 122 is aligned (lined up) so as to correct the insertion angle. In the first embodiment, since the slit sleeve 31 engaged with the precision sleeve 30 and connected thereto, the inserted plug ferrule 122 is aligned to enter almost straight into the center of the precision sleeve 30 while advancing in the slit sleeve 31, and the insertion angle is corrected.

Still additionally, since the inner diameter of the slit sleeve 31 in the state connected thereto is almost equal to the inner diameter of the precision sleeve 30, the inserted plug ferrule 122 can be inserted without being caught on the entrance portion of the precision sleeve 30.

That is, at the insertion of an optical terminal member such as the optical connector plug 130, the tip portion of a plug body such as the plug ferrule 122 does not gnaw on the entrance portions of the slit sleeve 31 and the precision sleeve 30 to be caught thereon, so the plug ferrule 122 does not come into collision with an optical propagation member such as a fiber stub or a glass plate by the force of the contracted spring 123 of the optical connector plug 130 unlike the optical receptacle 108 employing only the conventional precision sleeve 30 and almost no impact occurs.

On the other hand, since the plug ferrule 122 of the optical connector plug 130 to be inserted is physically brought into contact with the fiber stub 28 and the close adhesion place is within the cavity hole 30h of the precision sleeve 30, even if a load exceeding a predetermined value is applied to the plug ferrule 122, the occurrence of a coupling loss is suppressible and the optical output fluctuation is suppressible, thereby satisfactorily maintaining the characteristic variation at the application of the load to a cord.

That is, since the length of the slit sleeve 31 is set to be shorter than the length of the precision sleeve 30 while an area 301 for supporting the plug ferrule 122 is provided between the tip position of the fiber stub 28 fixed to the other end portion 30-2 in the precision sleeve 30 and the one end portion 30-1 connected to the slit sleeve 31, at the coupling with the optical connector plug 130, the plug ferrule 122, together with the fiber stub 28 which is the object of contact, is supported within the cavity hole 30h of the precision sleeve 30, so the characteristic variation at the application of a load to a cord is considerably improvable in comparison with the cases disclosed in the aforesaid Patent Documents 1 and 2.

As described above, the first embodiment of the present invention has an advantage of providing the optical receptacle 25 with a simple structure which can prevent a large impact from occurring when the plug ferrule 122 comes into collision with the fiber stub 28 due to the force of the spring 123 of the optical connector plug 130 at the insertion of the optical connector plug 130 while employing the precision sleeve 30 which shows less characteristic fluctuation at the application of a load to a cord.

In a case in which a TOSA employing the optical receptacle 25 according to the first embodiment was mounted in an SFP and an LC Optical fiber cord was connected thereto, the optical output fluctuation of the TOSA was confirmed when a predetermined load (for example, 100 gf) was applied to the cord. In the case of the optical receptacle 25 according to the first embodiment which includes the precision sleeve 30, the optical output fluctuation was below a predetermined value (below 1 dB), so the optical receptacle 1 according to the first embodiment can be put into practical use. Moreover, although in the first embodiment the inner diameter of the precision sleeve 30 is set at approximately 1.251 mm, in the case of approximately 1.250 to 1.252 mm, the characteristic fluctuation at the application of a load to a cord becomes acceptable.

[a1] Description of First Modification of First Embodiment

Figure 3:
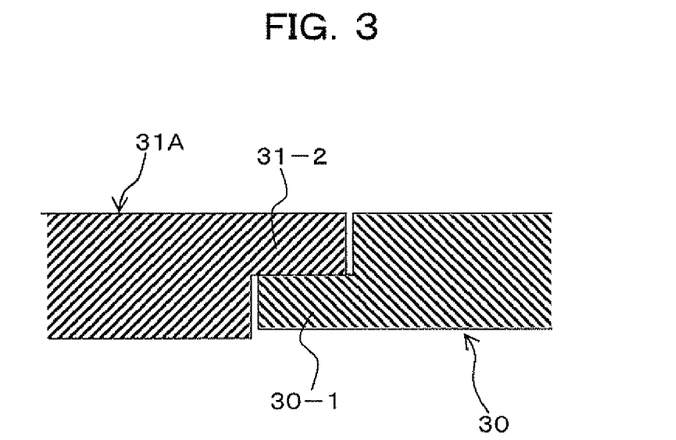
FIG. 3 is an illustration for explaining a first modification of the first embodiment of the present invention.

FIG. 3 is an illustration for explaining a first modification of the first embodiment of the present invention, and is an enlarged view showing a structure of a place corresponding to the connection portion A in FIG. 1. A slit sleeve 31A different from that in the above-described first embodiment is provided as shown in FIG. 3. That is, although the second end portion 31-2 which is an engagement portion of the slit sleeve 31A is circumscribed about the one end portion 30-1 which is an engagement portion of the precision sleeve 30, an inner wall of the slit sleeve 31A in a state connected is shifted more inwardly with respect to an inner wall of the precision sleeve 30.

Therefore, the inner diameter of the slit sleeve 31A in a state connected is set to be slightly smaller than the inner diameter of the precision sleeve 30 but equal to or larger than the outer diameter of the plug ferrule 122. Therefore, in addition to the advantages in the above-described first embodiment, there is an advantage that the inserted plug ferrule 122 is more easily inserted without being caught on the entrance portion of the precision sleeve 30 in comparison with the above-mentioned case of the first embodiment.

[a2] Description of Second Modification of First Embodiment

Figure 4:
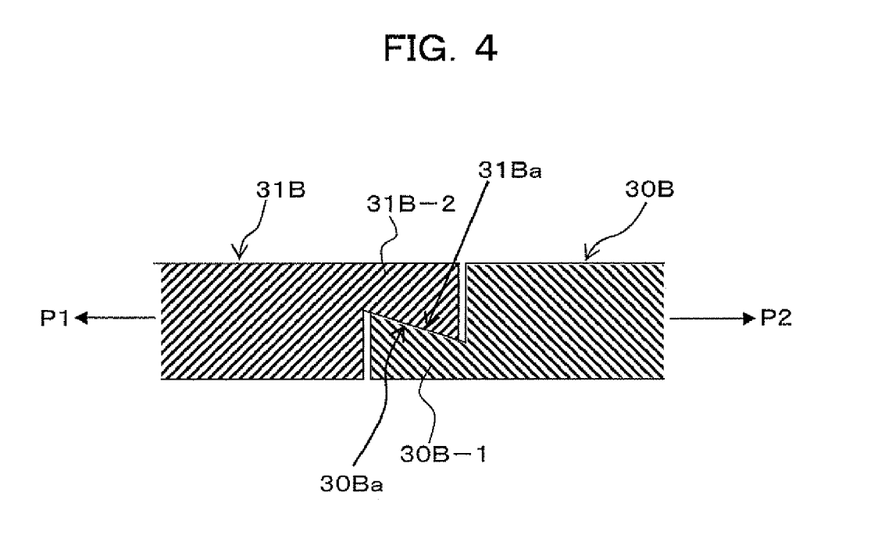
FIG. 4 is an illustration for explaining a second modification of the first embodiment of the present invention.

FIG. 4 is an illustration for explaining a second modification of the first embodiment of the present invention, and is an enlarged view showing a structure of a place corresponding to the connection portion A in FIG. 1. In this second modification, a precision sleeve 30B and a slit sleeve 31B, which have a connection structure different from that in the above-described first embodiment, are provided as shown in FIG. 4.

That is, one end portion 30B-1 which is an engagement portion of the precision sleeve 30B and a second end portion 31B-2 which is an engagement portion of the slit sleeve 31B respectively have reverse tapered surfaces 30Ba and 31Ba which come into contact with each other in a reverse tapered state. In the case of the employment of these reverse tapered surfaces 30Ba and 31Ba, even if forces P1 and P2 operate in directions of releasing from the engagement between the precision sleeve 30B and the slit sleeve 31B, the reaction forces from the mutually reverse tapered surfaces 30Ba and 31Ba can act against these forces P1 and P2. Accordingly, the one end portion 30B-1 of the precision sleeve 30B and the second end portion 31B-2 of the slit sleeve 31B have a configuration to check the release (separation) from the engagement therebetween.

Therefore, since the engagement portions 30B-1 and 31B-2 of the precision sleeve 30B and the slit sleeve 31B have a configuration including the reverse tapered surfaces 30Ba and 31Ba, in addition to the same advantages as the above-mentioned advantages of the first embodiment, the second modification of the first embodiment can provide an advantage of avoiding the release from the engagement between the slit sleeve 31B and the precision sleeve 30B so as to improve the connection performance therebetween.

Figure 5:
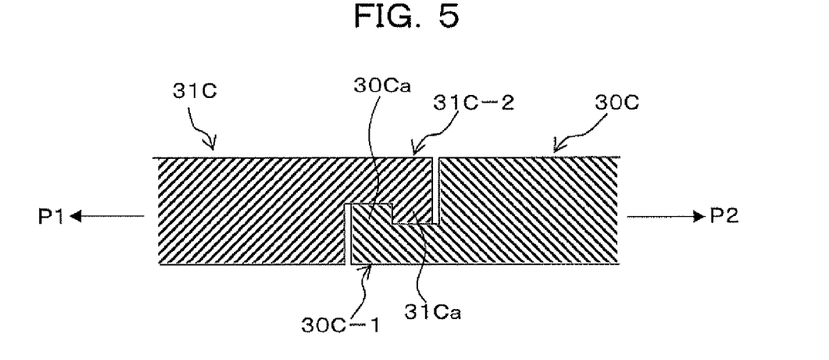
FIG. 5 is an illustration for explaining another example of the second modification of the first embodiment of the present invention.

Moreover, also in a case in which, as shown in FIG. 5, one end portion 30C-1 which is an engagement portion of a precision sleeve 30C and a second end portion 31C-2 which is an engagement portion of a slit sleeve 31C respectively have hook-shaped catching portions 30Ca and 31Ca capable of producing reaction forces when forces P1 and P2 operate in directions of releasing from the engagement between the precision sleeve 30C and the slit sleeve 31C, the same advantages are obtainable.

[a3] Description of Third Modification of First Embodiment

Figure 6:
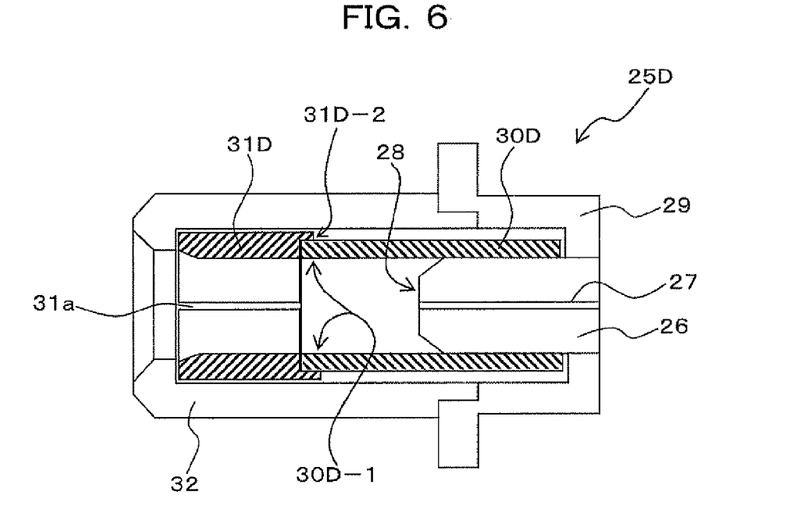
FIG. 6 is a cross-sectional view showing an optical receptacle according to a third modification of the first embodiment of the present invention.

FIG. 6 is a cross-sectional view showing an optical receptacle 25D according to a third modification of the first embodiment of the present invention. Although the optical receptacle 25D shown in FIG. 6 has a precision sleeve 30D and a slit sleeve 31D which are different in structure from those in the above-described first embodiment, the other structure is basically the same as that of the first embodiment. In FIG. 6, the same reference numerals as those used in FIG. 1 designate the almost similar parts.

In the optical receptacle 25D shown in FIG. 6, the slit sleeve 31D has a thickness larger than that of the precision sleeve 30D and, in this case, there is no need to cut out one end portion 30D-1 of the precision sleeve 30D for the engagement with the slit sleeve 31D. Thus, the precision sleeve 30D has a tubular configuration having substantially continuous even inner and outer diameters and thickness.

In addition, although a second end portion 31D-2 of the slit sleeve 31D, which is an engagement portion, is circumscribed about one end portion 30D-1 which is an engagement portion of the precision sleeve 30D, the slit sleeve 31D has a thickness larger than that of the precision sleeve 30D by a value corresponding to this circumscription, and the inner diameter of the slit sleeve 31D is set to be approximately equal to the inner diameter of the precision sleeve 30D or it is set to be smaller than the inner diameter of the precision sleeve 30D so as not to become smaller than the outer diameter of a plug body such as the plug ferrule 122.

Therefore, in addition to the advantages of the above-described first embodiment, this modification can eliminate the need for special processing for the engagement with the precision sleeve 30D, which enables simplifying the manufacturing steps.

[a4] Description of Fourth Modification of First Embodiment

Figure 7:
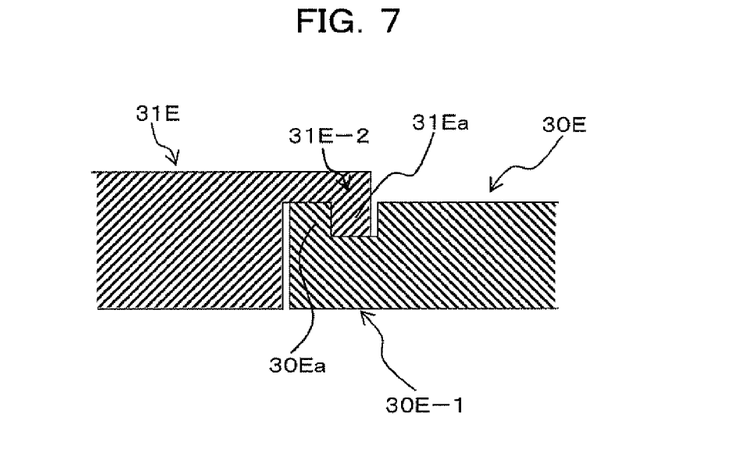
FIG. 7 is an illustration for explaining a fourth modification of the first embodiment of the present invention.

FIG. 7 is an illustration for explaining a fourth modification of the present invention and is an enlarged view showing a structure of a place corresponding to the connection portion A in FIG. 1. That is, combined with the connection structure between the above-mentioned precision sleeve 30D and slit sleeve 31D shown in FIG. 6, a precision sleeve 30E and a slit sleeve 31E shown in FIG. 7 respectively have catching portions 30Ea and 31Ea similar to those mentioned above with reference to FIG. 5. In addition to the same advantages as those of the above-described first embodiment, this can provide an advantage of inhibiting the release from the engagement between the precision sleeve 30E and the slit sleeve 31E.

[b] Description of Second Embodiment

Figure 8:
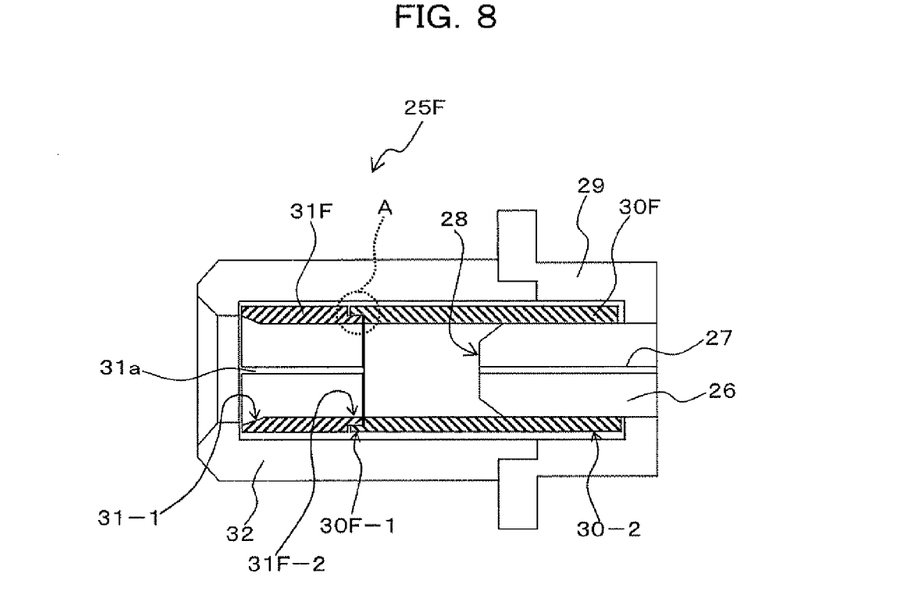
FIG. 8 is a cross-sectional view showing an optical receptacle according to a second embodiment of the present invention.

FIG. 8 is a cross-sectional view showing an optical receptacle 25F according to a second embodiment of the present invention. The optical receptacle 25F shown in FIG. 8 has a precision sleeve 30F and a slit sleeve 31F which are different from those in the above-described first embodiment, and other structure is basically similar thereto. In FIG. 8, the same reference numerals as those used in FIG. 1 designate almost same parts.

Figure 9:
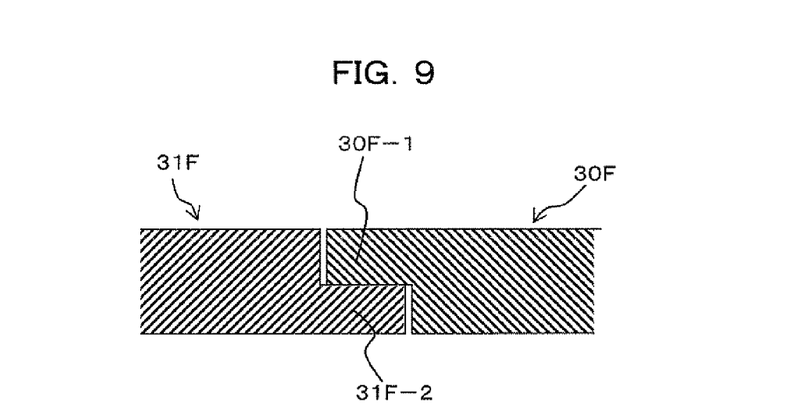
FIG. 9 is an enlarged view showing a connection portion between a slit sleeve and a precision sleeve according to the second embodiment.

FIG. 9 is an enlarged view showing a connection portion A in FIG. 8. As shown in FIG. 9, a second end portion 31F-2 which is an engagement portion of the slit sleeve 31F is inscribed (not circumscribed) with respect to one end portion 30F-1 which is an engagement portion of the precision sleeve 30F unlike the case of the first embodiment. That is, the slit sleeve 31F and the precision sleeve 30F are connected to each other in a state where the second end portion 31F-2 is brought into contact with an inner edge of the one end portion 30F-1.

In addition, as shown in FIG. 9, the one end portion 30F-1 of the precision sleeve 30F and the second end portion 31F-2 of the slit sleeve 31F are formed as engagement portions having a spot facing structure for making the engagement therebetween. That is, the one end portion 30F-1 of the precision sleeve 30F has a cut-out structure that its inner edge portion is cut out, and the second end portion 31F-2 of the slit sleeve 31F has a cut-out structure that its outer edge portion is cut out. The precision sleeve 30F and the slit sleeve 31F are engaged with each other by means of these end portions 30F-1 and 31F-2 for the connection therebetween.

Still additionally, the inner diameter of the slit sleeve 31F in the connected state is set to be approximately equal to the inner diameter of the precision sleeve 30F, and the thicknesses of the slit sleeve 31F and the precision sleeve 30F are made to be almost equal to each other. Thus, the plug ferrule 122 introduced through the first end portion 31F-1 of the slit sleeve 31F can be inserted without suffering interference when passing through the end portions 31F-2 and 30F-1 making the above-mentioned connection portion between the slit sleeve 31F and the precision sleeve 30F.

Still moreover, in the second embodiment, as the member condition of the slit sleeve 31F before the connection, the outer diameter of the engagement portion 31F-2 is made to be larger than the inner diameter of the engagement portion 30F-1 of the precision sleeve 30F. Thus, the precision sleeve 30F and the slit sleeve 31F are engaged with each other for the connection therebetween by means of an elastic force produced when the slit sleeve 31F tends to enlarge, in other words, an elastic force generated when a split 31a (more closed than normal) of the slit sleeve 31F tends to open with the second end portion 31F-2 of the slit sleeve 31F being engaged with the one end portion 30F-1 of the precision sleeve 30F.

Thus, according to the second embodiment, since the second end portion 31F-2 which is an engagement of the slit sleeve 31F is inscribed in the one end portion 30F-1 which is an engagement portion of the precision sleeve 30F, although, with respect to the precision sleeve 30F side (engagement side) of the slit sleeve 31F, limitation is somewhat improve on the free enlargement of its inner diameter in comparison with the case of the first embodiment, this limitation contributes to further enhancing the advantage that the optical connector plug 130 is lined up to straight enter the center of the precision sleeve 30F in accordance with the insertion into the slit sleeve 31F so as to correct the insertion angle, in comparison with the case of the first embodiment, and the inserted plug ferrule 122 can easily be inserted without being caught on the one end portion 30F-1 which is the entrance portion of the precision sleeve 30F.

As described above, as well as the above-described first embodiment, the second embodiment of the present invention also has an advantage of providing the optical receptacle 25F with a simple structure which can prevent a large impact from occurring when the plug ferrule 122 comes into collision with the fiber stub 28 due to the force of the spring 123 of the optical connector plug 130 at the insertion of the optical connector plug 130 while employing the precision sleeve 30F which shows less characteristic fluctuation at the application of a load to a cord.

[b1] Description of First Modification of Second Embodiment

Figure 10:
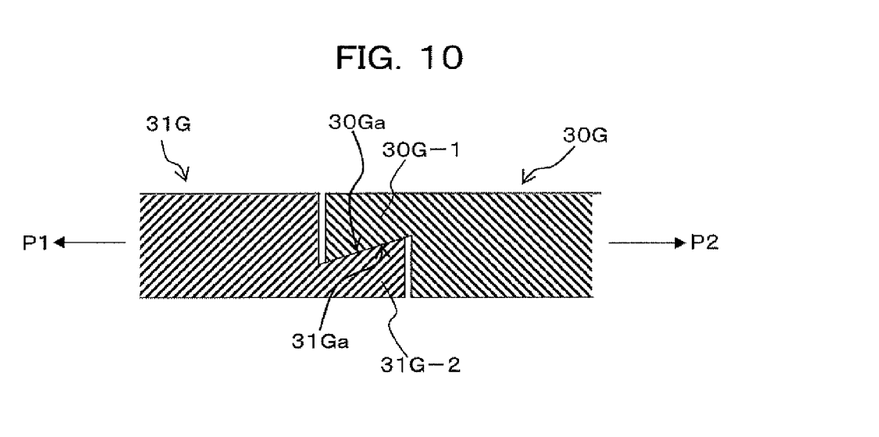
FIG. 10 is an illustration for explaining a first modification of the second embodiment of the present invention.

FIG. 10 is an illustration for explaining a first modification of the second embodiment of the present invention, and is an enlarged view showing a structure of a place corresponding to the connection portion A in FIG. 8. In this first modification, a precision sleeve 30G and a slit sleeve 31G, which have a connection structure different from that of the above-described second embodiment, are provided as shown in FIG. 10.

That is, in conjunction with the above-mentioned structure shown in FIG. 4, one end portion 30G-1 which is an engagement portion of the precision sleeve 30G and a second end portion 31G-2 which is an engagement portion of the slit sleeve 31G respectively have reverse tapered surfaces 30Ga and 31Ga which come into contact with each other in a reverse tapered state. In the case of the employment of these reverse tapered surfaces 30Ga and 31Ga, even if forces P1 and P2 operate in directions of releasing from the engagement between the precision sleeve 30G and the slit sleeve 31G, the reaction forces from the mutually reverse tapered surfaces 30Ga and 31Ga can act against these forces P1 and P2. Accordingly, the one end portion 30G-1 of the precision sleeve 30G and the second end portion 31G-2 of the slit sleeve 31G have a configuration to check the release from the engagement therebetween.

Therefore, since the engagement portions 30G-1 and 31G-2 of the precision sleeve 30G and the slit sleeve 31G have a configuration have a configuration including the reverse tapered surfaces 30Ga and 31Ga, in addition to the same advantages as the above-mentioned advantages of the second embodiment, this modification can provide an advantage of avoiding the release from the engagement between the slit sleeve 31G and the precision sleeve 30G so as to improve the connection performance therebetween.

Figure 11:
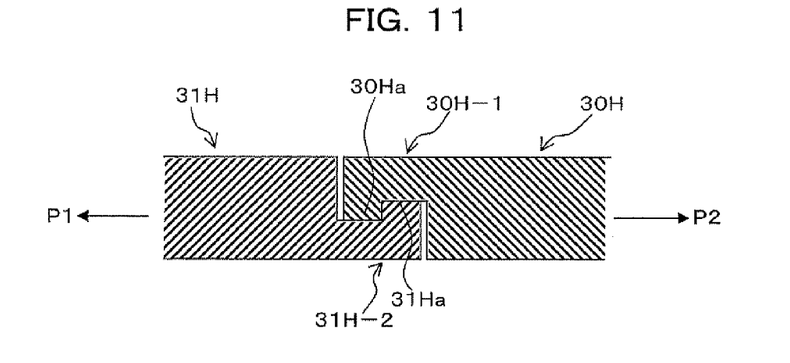
FIG. 11 is an illustration for explaining another example of the first modification of the second embodiment of the present invention.

Moreover, also in a case in which, as shown in FIG. 11, one end portion 30H-1 which is an engagement portion of a precision sleeve 30H and a second end portion 31H-2 which is an engagement portion of a slit sleeve 31H respectively have hook-shaped catching portions 30Ha and 31Ha capable of producing reaction forces when forces P1 and P2 operate in directions of releasing from the engagement between the precision sleeve 30H and the slit sleeve 31H, the same advantages are obtainable.

[b2] Description of Second Modification of Second Embodiment

Figure 12:
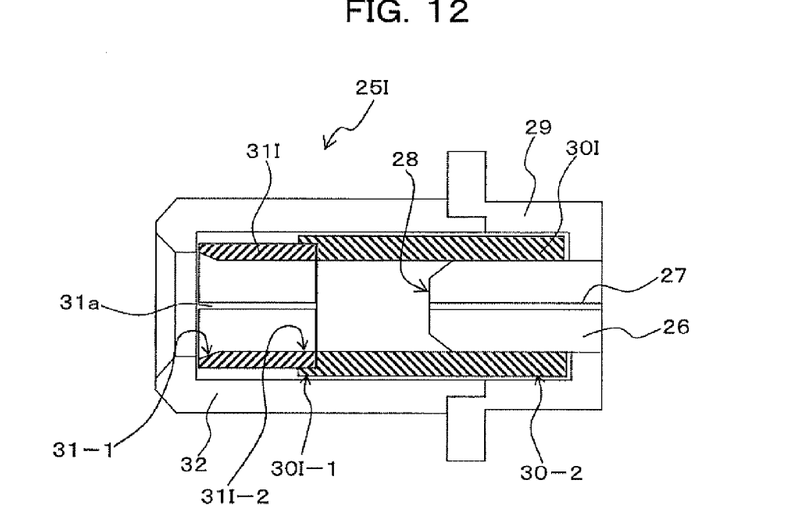
FIG. 12 is a cross-sectional view showing an optical receptacle according to a second modification of the second embodiment of the present invention.

FIG. 12 is a cross-sectional view showing an optical receptacle 25I according to a second modification of the second embodiment of the present invention. The optical receptacle 25I shown in FIG. 12 includes a precision sleeve 30I and a slit sleeve 31I which have a structure different from that of the above-described second embodiment, and the other structure is basically similar to that of the second embodiment. In FIG. 12, the same reference numerals as those used in FIG. 8 designate almost same parts.

In the optical receptacle 25I shown in FIG. 12, the thickness of the precision sleeve 30I has a thickness larger than a thickness of the slit sleeve 31I and, in this case, there is no need to cut out the second end portion 30I-2 of the slit sleeve 31I for the engagement with the precision sleeve 30I. Thus, the slit sleeve 31I has a tubular configuration having substantially even inner and outer diameters and thickness except a chamfered portion, although it has a split 31a.

In addition, although the second end portion 31I-2 of the slit sleeve 31I, which is an engagement portion, is inscribed with respect to one end portion 30I-1 which is an engagement portion of the precision sleeve 30I, the precision sleeve 30I has a thickness larger than that of the slit sleeve 31I by a value corresponding to this inscription, and an inner edge of the one end portion 30I-1 is cut out for the inscription with respect to the slit sleeve 31I. Moreover, the inner diameter of the slit sleeve 31I is set to be approximately equal to the inner diameter of the precision sleeve 30I.

Therefore, in addition to the advantages of the above-described second embodiment, this modification can eliminate the need for special processing for the engagement with the slit sleeve 31I, which enables simplifying the manufacturing steps.

[c] Description of Third Embodiment

Figure 13:
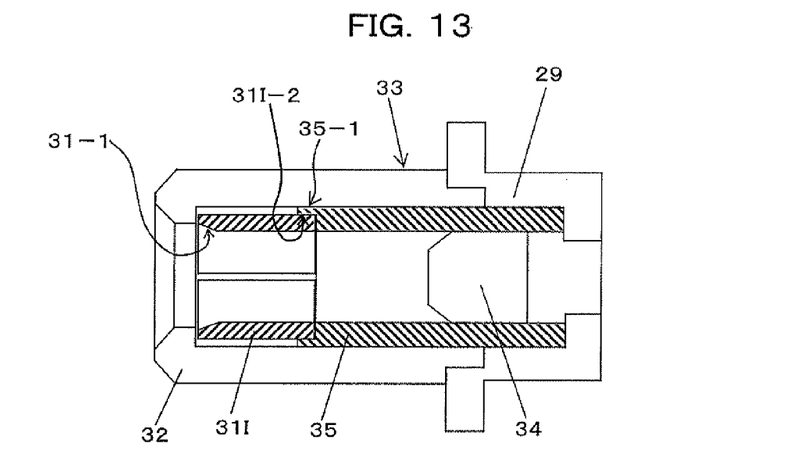
FIG. 13 is a cross-sectional view showing an optical receptacle according to a third embodiment of the present invention.

FIG. 13 is a cross-sectional view showing an optical receptacle 33 according to a third embodiment of the present invention. In comparison with the above-described second modification (see reference numeral 25I of FIG. 12) of the second embodiment, in the optical receptacle 33 according to the third embodiment, a glass plate 34 is used as an optical propagation member in place of the fiber stub 28 and a precision sleeve 35 is made from a crystallized glass. Other structure is basically the same. In FIG. 13, the same reference numerals as those used in FIG. 12 designate almost same parts.

In the optical receptacle 33 according to the third embodiment, the glass plate 34 is fixedly secured through adhesion to an inner surface of the precision sleeve 35, and the precision sleeve 35 is precisely fixed to a holder 29 made of a metal and a sleeve case 32 to be integrated therewith. Moreover, in the third embodiment, the precision sleeve 35 has an inner diameter of approximately 1.252 mm.

The slit sleeve 31I is made to be shorter than the precision sleeve 35 and is engaged with one end portion 35-1 of the precision sleeve 35 on the insertion side of the plug ferrule 122 for the connection therebetween in a state inscribed with respect to the precision sleeve 35 as well as the case shown in FIG. 12.

Thus, as well as the case shown in FIG. 12, at the insertion of the optical connector plug 130, the tip portion of the plug ferrule 122 does not gnaw on the entrance portions of the slit sleeve 31I and the precision sleeve 35 to be caught thereon, so the plug ferrule 122 does not come into collision with the glass plate 34 and others by the force of the contracted spring of the optical connector plug unlike the optical receptacle employing only a conventional precision sleeve, and almost no impact occurs.

As described above, the third embodiment of the present invention also has an advantage of providing the optical receptacle 33 with a simple structure which can prevent a large impact from occurring when the plug ferrule 122 comes into collision with the glass plate 34 due to the force of the spring 123 of the optical connector plug 130 at the insertion of the optical connector plug 130 while employing the precision sleeve 35 which shows less characteristic fluctuation at the application of a load to a cord.

In a case in which an ROSA employing the optical receptacle 33 according to the third embodiment was mounted in an SFP and an LC optical fiber cord was connected thereto, the reception sensitivity fluctuation of the ROSA was confirmed when a predetermined load (for example, 100 gf) was applied to the cord. In the case of the optical receptacle 33 according to the third embodiment which includes the precision sleeve 35, the reception sensitivity fluctuation was below a predetermined value (below 1 dB), so the optical receptacle 33 according to the third embodiment can be put into practical use.

Moreover, naturally, also in a case in which a glass plate 34 is used as an optical propagation member as well as the above-described third embodiment, a structure having the precision sleeves and the slit sleeves mentioned above with reference to FIGS. 2 to 11 is also applicable.

[d] Others

It should be understood that the present invention is not limited to the above-described embodiments, and that it is intended to cover all changes and modifications of the embodiments of the invention herein which do not constitute departures from the spirit and scope of the invention.

The disclosure of the embodiments enables a person skilled in the art to manufacture the apparatus according to the present invention.

What is claimed is:

1. An optical receptacle, which accepts a plug body constituting an optical terminal member for optical coupling, comprising:
    a tubular slit sleeve in which a split is made in an axial direction and into which said plug body is introduced from its first end portion;
    a tubular solid sleeve into which said plug body introduced into said slit sleeve is inserted from its one end portion and which has an inner diameter so as not to substantially define a gap with respect to an outer diameter of said plug body; and
    an optical propagation member which is fixedly secured to the other end portion of said solid sleeve and which is optically coupled to said plug body,
    a second end portion opposite to said first end portion of said slit sleeve and said one end portion of said solid sleeve being engaged to be connected to each other.

2. The optical receptacle according to claim 1, wherein said second end portion of said slit sleeve is connected to said one end portion of said solid sleeve in a state circumscribed about said one end portion thereof.

3. The optical receptacle according to claim 2, wherein an inner diameter of said slit sleeve connected to said solid sleeve is made to be substantially equal to an inner diameter of said solid sleeve or made to be smaller than the inner diameter of said solid sleeve but equal to or larger than an outer diameter of said plug body.

4. The optical receptacle according to claim 2, wherein said slit sleeve is made with a member whose inner diameter is smaller than an outer diameter of said one end portion of said solid sleeve in a state before the connection to said solid sleeve, and said slit sleeve and said solid sleeve are engaged with each other to make the connection therebetween by means of an elastic force acting to close said split made in said slit sleeve.

5. The optical receptacle according to claim 2, wherein said slit sleeve is formed such that its thickness is larger than a thickness of said solid sleeve.

6. The optical receptacle according to claim 1, wherein said second end portion of said slit sleeve is connected to said one end portion of said solid sleeve in a state inscribed with respect to said one end portion.

7. The optical receptacle according to claim 6, wherein an inner diameter of said slit sleeve connected to said solid sleeve is set to be substantially equal to an inner diameter of said solid sleeve.

8. The optical receptacle according to claim 6, wherein said slit sleeve is made with a member whose outer diameter is larger than an inner diameter of said one end portion of said solid sleeve in a state before the connection to said solid sleeve, and said slit sleeve and said solid sleeve are engaged with each other to make the connection therebetween by means of an elastic force acting to open said split made in said slit sleeve.

9. The optical receptacle according to claim 2, wherein said slit sleeve has a thickness smaller than a thickness of said solid sleeve.

10. The optical receptacle according to claim 1, wherein said second end portion of said slit sleeve and said one end portion of said solid sleeve have a shape to prevent release from the engagement therebetween.

11. The optical receptacle according to claim 1, wherein a length of said slit sleeve is set to be shorter than a length of said solid sleeve.

12. The optical receptacle according to claim 1, wherein said solid sleeve has an area for supporting said plug body between a tip position of a place where said optical propagation member fixedly secured to the other end portion thereof confronts said plug body and said one end portion connected to said slit sleeve.

13. The optical receptacle according to claim 1, wherein said optical propagation member is made from a ferrule through which an optical fiber passes.

14. The optical receptacle according to claim 1, wherein said optical propagation member is made from a glass member.

15. An optical sub assembly comprising the optical receptacle defined in claim 1.

16. An optical transceiver comprising the optical receptacle defined in claim 1.

* * * * *